(12) United States Patent
Subbu et al.

(10) Patent No.: US 7,536,364 B2
(45) Date of Patent: May 19, 2009

(54) METHOD AND SYSTEM FOR PERFORMING MODEL-BASED MULTI-OBJECTIVE ASSET OPTIMIZATION AND DECISION-MAKING

(75) Inventors: Rajesh V. Subbu, Clifton Park, NY (US); Piero P. Bonissone, Schenectady, NY (US); Neil H. Eklund, Schenectady, NY (US); Naresh S. Iyer, Clifton Park, NY (US); Rasiklal P. Shah, Latham, NY (US); Weizhong Yan, Clifton Park, NY (US); Chad E. Knodle, Dayton, NV (US); James J. Schmid, Kirkland, WA (US)

(73) Assignee: General Electric Company, Schenectady, NY (US)

( * ) Notice: Subject to any disclaimer, the term of this patent is extended or adjusted under 35 U.S.C. 154(b) by 113 days.

(21) Appl. No.: 11/116,920

(22) Filed: Apr. 28, 2005

(65) Prior Publication Data

US 2006/0271210 A1 Nov. 30, 2006

(51) Int. Cl.
*G06N 7/00* (2006.01)
*G05B 13/04* (2006.01)
(52) U.S. Cl. ............... 706/13; 700/28; 700/29; 700/30; 700/32; 700/33; 700/34
(58) Field of Classification Search ............ 706/13, 706/15; 700/28–34
See application file for complete search history.

(56) References Cited

U.S. PATENT DOCUMENTS

| | | | |
|---|---|---|---|
| 5,212,765 A | 5/1993 | Skeirik | 395/11 |
| 5,249,954 A | 10/1993 | Allen et al. | 431/14 |
| 5,251,285 A | 10/1993 | Inoue et al. | 395/10 |
| 5,311,421 A | 5/1994 | Nomura et al. | 364/157 |
| 5,333,240 A | 7/1994 | Matsumoto et al. | 395/23 |
| 5,386,373 A | 1/1995 | Keeler et al. | 364/577 |
| 5,477,444 A | 12/1995 | Bhat et al. | 364/152 |

(Continued)

OTHER PUBLICATIONS

Internet Citing: Resrarch article "Multi-objective optimization of the coal combustion performance with artificial neural networks and genetic algorithms" published online: Feb. 24, 2005; [retrieved on Oct. 25, 2005]; retrieved from the Internet http://www3.interscience.wiley.com/cgi-bin/abstract/109930971/ABSTRACT.
Abbass et al, "PDE: a Pareto-frontier differential evolution approach formulti-objective optimization problems" School of Computer Science, New South Wales University, Canberra, ACT, 2001 Evolutionary Computation. vol. 2, pp. 971-978.

*Primary Examiner*—David R Vincent
*Assistant Examiner*—Nathan H Brown, Jr.
(74) *Attorney, Agent, or Firm*—Cantor Colburn LLP

(57) ABSTRACT

A method and system for performing model-based multi-objective asset optimization and decision-making is provided. The method includes building at least two predictive models for an asset. The building includes categorizing operational historical data via at least one of: controllable variables, uncontrollable variables, output objectives, and constraints. The building also includes selecting at least two output objectives or constraints, and identifying at least one controllable or uncontrollable variable suitable for achieving the at least two output objectives or constraints. The method also includes validating each predictive model and performing multi-objective optimization using the predictive models. The multi-objective optimization includes specifying search constraints and applying a multi-objective optimization algorithm. The method further includes generating a Pareto Frontier, and selecting a Pareto optimal input-output vector.

18 Claims, 9 Drawing Sheets

U.S. PATENT DOCUMENTS

| | | | |
|---|---|---|---|
| 5,548,528 A | 8/1996 | Keeler et al. | 364/497 |
| 5,613,041 A | 3/1997 | Keeler et al. | 395/23 |
| 5,729,661 A | 3/1998 | Keeler et al. | 395/213 |
| 5,734,796 A | 3/1998 | Pao | 395/22 |
| 5,751,571 A | 5/1998 | Tresp et al. | 364/148 |
| 5,781,430 A | 7/1998 | Tsai | 364/148 |
| 5,781,432 A | 7/1998 | Keeler et al. | 364/164 |
| 5,819,006 A | 10/1998 | Keeler et al. | 395/22 |
| 5,825,646 A | 10/1998 | Keeler et al. | 364/164 |
| 5,842,189 A | 11/1998 | Keeler et al. | 706/16 |
| 5,971,747 A | 10/1999 | Lemelson et al. | 431/12 |
| 5,993,194 A | 11/1999 | Lemelson et al. | 431/14 |
| 6,038,540 A | 3/2000 | Krist et al. | 705/8 |
| 6,045,353 A | 4/2000 | VonDrasek et al. | 431/79 |
| 6,085,183 A | 7/2000 | Horn et al. | 706/45 |
| 6,112,517 A | 9/2000 | Yasui et al. | 60/274 |
| 6,169,980 B1 | 1/2001 | Keeler et al. | 706/21 |
| 6,188,953 B1 | 2/2001 | Yasui et al. | 701/109 |
| 6,212,509 B1 | 4/2001 | Pao et al. | 706/16 |
| 6,216,048 B1 | 4/2001 | Keeler et al. | 700/44 |
| 6,227,842 B1 | 5/2001 | Lemelson et al. | 431/12 |
| 6,243,696 B1 | 6/2001 | Keeler et al. | 706/21 |
| 6,278,899 B1 | 8/2001 | Piche et al. | 700/44 |
| 6,314,413 B1 | 11/2001 | Otte | 706/15 |
| 6,314,414 B1 | 11/2001 | Keeler et al. | 706/21 |
| 6,321,216 B1 | 11/2001 | Otte et al. | 706/21 |
| 6,381,504 B1 | 4/2002 | Havener et al. | 700/44 |
| 6,438,430 B1 | 8/2002 | Martin et al. | 700/28 |
| 6,468,069 B2 | 10/2002 | Lemelson et al. | 431/12 |
| 6,507,774 B1 | 1/2003 | Reifman et al. | 700/274 |
| 6,522,994 B1 | 2/2003 | Lang | 702/183 |
| 6,591,254 B1 | 7/2003 | Keeler et al. | 706/21 |
| 6,651,035 B1 | 11/2003 | Lang | 702/183 |
| 6,662,059 B2 | 12/2003 | Ito et al. | 700/75 |
| 6,737,089 B2 | 5/2004 | Wadsworth et al. | 424/777 |
| 2006/0247798 A1 | 11/2006 | Subbu et al. | |

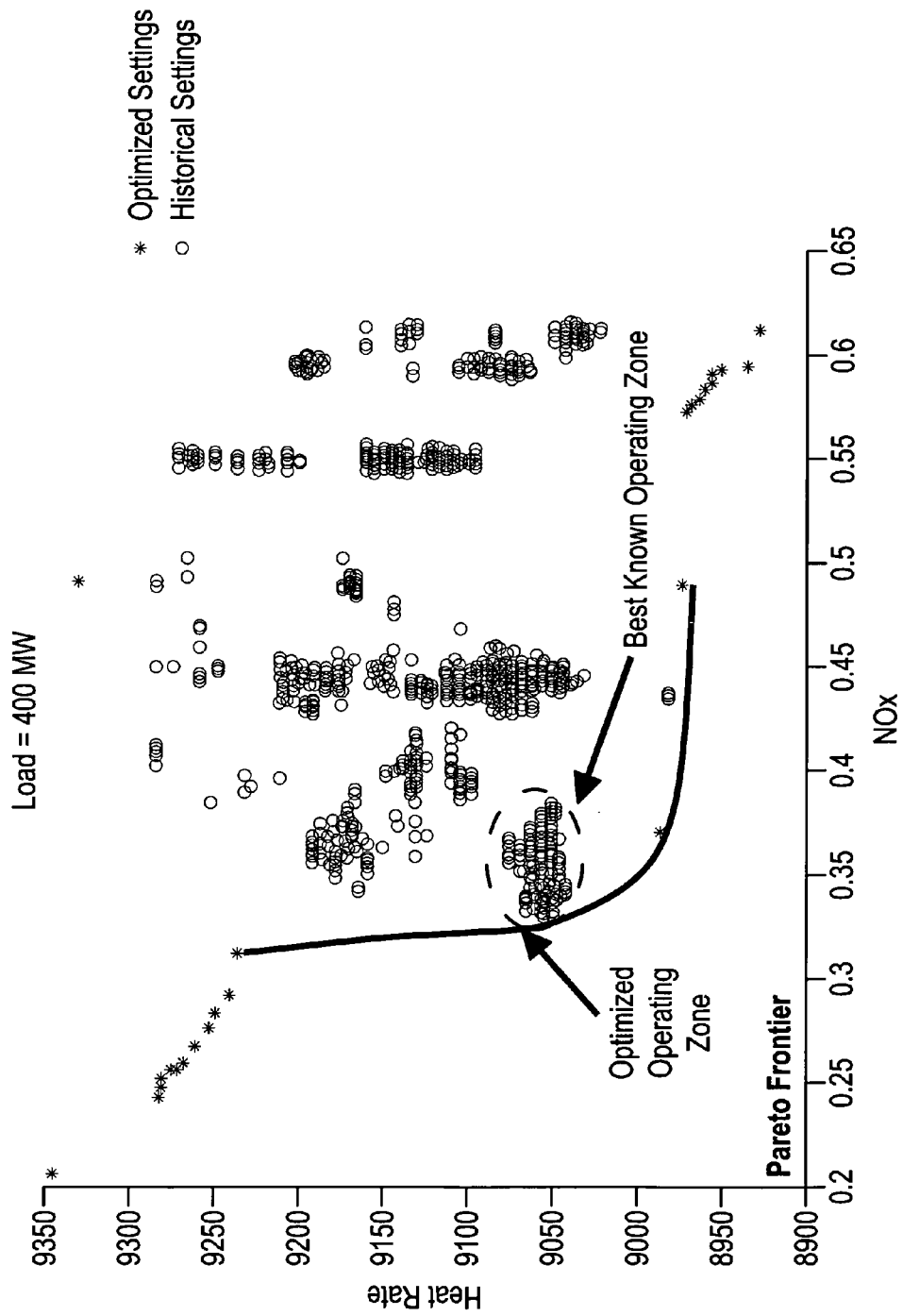

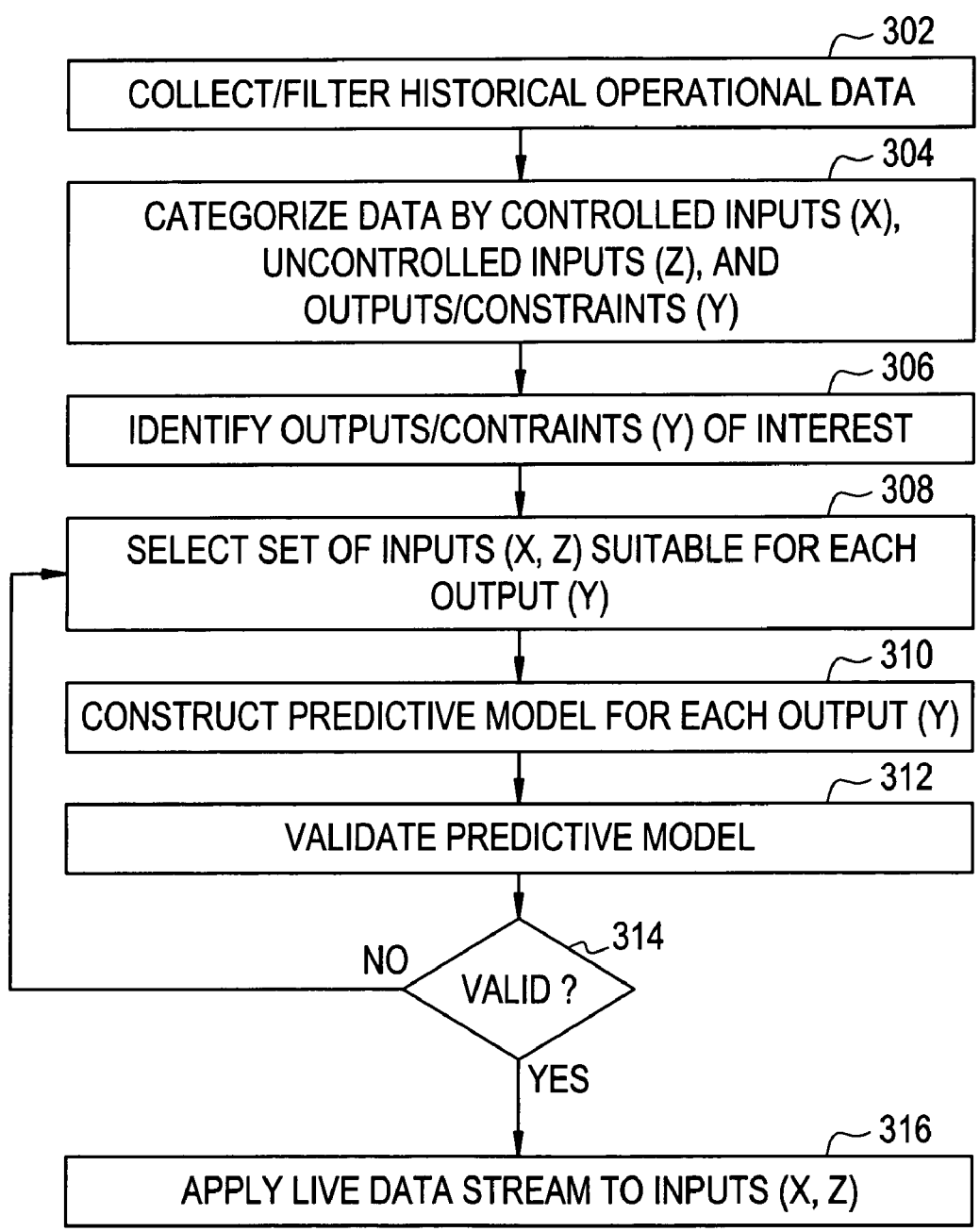

FIG. 5

| | | ☐ X Vectors | $X_v$ Air Flow | $X_v$ Pressure | $X_v$ Air Flow2 | ☐ Y Objectives | $Y_v$ NOx | ☐ Y Constraints | $Y_c$ Load | ☐ Z Values | $Z_n$ Room Temperature |
|---|---|---|---|---|---|---|---|---|---|---|---|
| | ≫ | ≪ | ≫ 100.0% | ≫ 100.0% | ≫ 100.0% | | ≫ 100.0% | | ≫ 100.0% | | ≫ 100.0% |
| 1 | 1/20/2004 12:00:00 AM | ≫100.0% | 75.4 | 301.2 | 75.1 | | 0.462 | | 301.2 | | 71.7 |
| 2 | 1/20/2004 12:30:00 AM | ≫100.0% | 75.1 | 300.1 | 75.2 | | 0.455 | | 300.1 | | 70.5 |
| 3 | 1/20/2004 1:00:00 AM | ≫100.0% | 75.2 | 300.7 | 75.1 | | 0.459 | | 300.7 | | 69.9 |
| 4 | 1/20/2004 1:30:00 AM | ≫100.0% | 75.1 | 302.2 | 75.5 | | 0.455 | | 302.2 | | 69.7 |
| 5 | 1/20/2004 2:00:00 AM | ≫100.0% | 75.5 | 299.9 | 75.6 | | 0.456 | | 299.9 | | 69.8 |
| 6 | 1/20/2004 2:30:00 AM | ≫100.0% | 75.6 | 301.1 | 75.5 | | 0.462 | | 301.1 | | 69.6 |
| 7 | 1/20/2004 3:00:00 AM | ≫100.0% | 75.5 | 300.2 | 75.1 | | 0.456 | | 300.2 | | 69.7 |
| 8 | 1/20/2004 3:30:00 AM | ≫100.0% | 75.1 | 299.9 | 75.4 | | 0.461 | | 299.9 | | 69.5 |
| 9 | 1/20/2004 4:00:00 AM | ≫100.0% | 75.4 | 300.2 | 75.1 | | 0.462 | | 300.2 | | 69.7 |
| 10 | 1/20/2004 4:30:00 AM | ≫100.0% | 75.1 | 299.9 | 75.2 | | 0.456 | | 299.9 | | 69.5 |
| 11 | 1/20/2004 5:00:00 AM | ≫100.0% | 75.2 | 300.2 | 75.1 | | 0.462 | | 300.2 | | 69.7 |
| 12 | 1/20/2004 5:30:00 AM | ≫100.0% | 75.1 | 300.2 | 75.2 | | 0.456 | | 300.2 | | 69.7 |
| 13 | 1/20/2004 6:00:00 AM | ≫100.0% | 75.2 | 299.9 | 75.6 | | 0.461 | | 299.9 | | 69.5 |

METHOD AND SYSTEM FOR PERFORMING MODEL-BASED MULTI-OBJECTIVE ASSET OPTIMIZATION AND DECISION-MAKING

BACKGROUND OF THE INVENTION

The present disclosure relates generally to process modeling, optimization, and control systems, and more particularly to a method and system for performing model-based asset optimization and decision-making.

Predictive models are commonly used in a variety of business, industrial, and scientific applications. These models could be based on data-driven construction techniques, based on physics-based construction techniques, or based on a combination of these techniques.

Neural Network modeling, is a well-known instance of data-driven predictive modeling. Such data-driven models are trainable using mathematically well-defined algorithms (e.g., learning algorithms). That is, such models may be developed by training them to accurately map process inputs onto process outputs based upon measured or existing process data. This training requires the presentation of a diverse set of several input-output data vector tuples, to the training algorithm. The trained models may then accurately represent the input-output behavior of the underlying processes.

Predictive models may be interfaced with an optimizer once it is determined that they are capable of faithfully predicting various process outputs, given a set of inputs. This determination may be accomplished by comparing predicted versus actual values during a validation process performed on the models. Various methods of optimization may be interfaced, e.g., evolution algorithms (EAs), which are optimization techniques that simulate natural evolutionary processes, or gradient-descent optimization techniques. The predictive models coupled with an optimizer may be used for realizing a process controller (e.g., by applying the optimizer to manipulate process inputs in a manner that is known to result in desired model and process outputs).

Existing solutions utilize neural networks for nonlinear asset modeling and single-objective optimization techniques that probe these models in order to identify an optimal input-output vector for the process. These optimization techniques use a single-objective gradient-based, or evolutionary optimizer, which optimize a compound function (i.e., by means of an ad hoc linear or nonlinear combination) of objectives.

What is needed is a framework that provides modeling and optimization in a multi-objective space, where there is more than one objective of interest, the objectives may be mutually conflicting, and cannot be combined to compound functions. Such a framework would be able to achieve optimal trade-off solutions in this space of multiple, often conflicting, objectives. The optimal set of trade-off solutions in a space of conflicting objectives is commonly referred to as the Pareto Frontier.

BRIEF DESCRIPTION OF THE INVENTION

In accordance with exemplary embodiments, a method and system for performing multi-objective asset optimization and decision-making via predictive modeling is provided.

A method for performing multi-objective asset optimization and decision-making using predictive modeling, includes building at least two predictive models for an asset. The building includes categorizing operational historical data by at least one of: controllable variables; uncontrollable variables; output objectives; and constraints. The building also includes selecting at least two output objectives or constraints, and identifying at least one controllable or uncontrollable variable suitable for achieving the at least two output objectives or constraints. The method also includes inputting the at least one controllable or uncontrollable variable to each of the at least two predictive models, and validating each predictive model. If results of the validating indicate a confidence level above a specified threshold, the method includes applying a live data stream of inputs to the predictive models. If results of the validating indicate a confidence level at or below a specified threshold, the method includes selecting at least one alternative controllable or uncontrollable variable for input to the predictive models. The method also includes performing multi-objective optimization using the predictive models. The multi-objective optimization includes specifying search constraints, which comprises: upper and lower bounds for each input variable; tolerance levels representing a range of values for achieving optimal output objectives, and constraints. The multi-objective optimization also includes applying a multi-objective optimization algorithm. The method also includes generating a Pareto Frontier, the Pareto Frontier including optimal input-output vectors; and selecting a Pareto optimal input-output vector.

A system for performing multi-objective asset optimization and decision-making using predictive modeling, includes: a processor; a network in communication with the processor; and a process manager implemented by the processor. The process manager performs building at least two predictive models for an asset. The building includes categorizing operational historical data by at least one of: controllable variables; uncontrollable variables; output objectives; and constraints. The building also includes selecting at least two output objectives or constraints, and identifying at least one controllable or uncontrollable variable suitable for achieving the at least two output objectives or constraints. The process manager also performs inputting the at least one controllable or uncontrollable variable to each of the at least two predictive models, and validating each predictive model. If results of the validating indicate a confidence level above a specified threshold, the process manager performs applying a live data stream of inputs to the predictive models. If results of the validating indicate a confidence level at or below a specified threshold, the process manager selects at least one alternative controllable or uncontrollable variable for input to the predictive models. The process manager also performs multi-objective optimization using the predictive models. The multi-objective optimization includes specifying search constraints, which comprises: upper and lower bounds for each input variable; tolerance levels representing a range of values for achieving optimal output objectives, and constraints. The multi-objective optimization also includes applying a multi-objective optimization algorithm. The process manager also performs generating a Pareto Frontier, the Pareto Frontier including optimal input-output vectors; and selecting a Pareto optimal input-output vector.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring to the exemplary drawings wherein like elements are numbered alike in the accompanying FIGURES:

FIG. 2 is a diagram of a Pareto Frontier graph of output objectives depicting results of an optimized process for various input variables;

FIG. 3 is a flow diagram describing a process for implementing multi-objective predictive modeling upon which the process management system may be implemented in accordance with exemplary embodiments;

FIG. 5 is an interface supporting the creating and cleansing of a model training data matrix for use in generating a predictive model in exemplary embodiments;

DETAILED DESCRIPTION OF THE INVENTION

Figure 1:
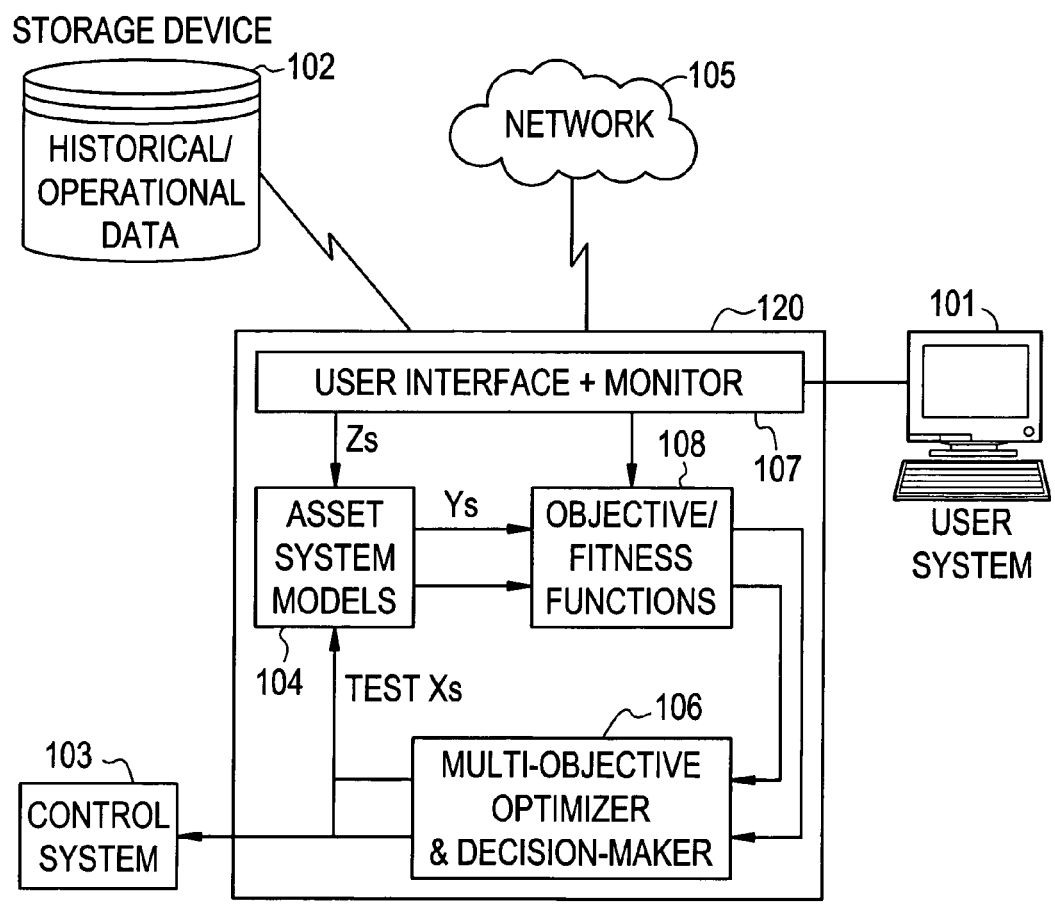
FIG. 1 depicts a block diagram of a model-based multi-objective optimization and decision-making system upon which the process management system may be implemented in accordance with exemplary embodiments.

In accordance with exemplary embodiments, a process management system is provided. The process management system performs closed-loop, model-based asset optimization and decision-making using a combination of data-driven and first-principles-based nonlinear models, and Pareto Frontier multi-objective optimization techniques based upon evolutionary algorithms and gradient descent. The process management system also performs on-line monitoring and adaptation of the nonlinear asset models. Predictive models refer to generalized models that are tuned to the specific equipment being measured and typically use sampled data in performing model generation and/or calibration. Pareto Frontier optimization techniques provide a framework for tradeoff analysis between, or among, desirable element attributes (e.g., where two opposing attributes for analysis may include turn rate versus range capabilities associated with an aircraft design, and the trade-off for an optimal turn rate (e.g., agility) may be the realization of diminished range capabilities).

A Pareto Frontier may provide a graphical depiction of all the possible optimal outcomes or solutions. Evolutionary algorithms (EAs) may be employed for use in implementing optimization functions. EAs are based on a paradigm of simulated natural evolution and use "genetic" operators that model simplified rules of biological evolution, which are then applied to create a new and desirably more superior population of solutions. Multi-objective EAs involve searches for, and maintenance of, multiple Pareto-optimal solutions during a given search which, in turn, allow the provision of an entire set of Pareto-optimal (Pareto Frontier) solutions via a single execution of the EA algorithm.

Optimization methods typically require starting points from which search is initiated. Unlike an EA that employs an initial population as a starting point, a gradient-based search algorithm employs an initial solution as a starting point (which may be randomly generated from the given search space).

In exemplary embodiments, nonlinear predictive, data-driven models trained and validated on an asset's historical data are constructed to represent the asset's input-output behavior. The asset's historical data refers to measurable input-output elements resulting from operation of the asset. For example, if the asset is a coal-fired boiler, the measurable elements may include emission levels of, e.g., nitrous oxides, carbon monoxide, and sulfur oxides. Historical data may also include operating conditions of the asset, such as fuel consumption and efficiency. Ambient conditions, such as air temperature and fuel quality may be also be measured and included with the historical data.

First-principles-based methods may be used in conjunction with the data-driven models for constructing predictive models representing the asset's input-output relationships. First-principles predictive models are based on a mathematical representation of the underlying natural physical principles governing the asset's input-output relationships. However, it may be necessary to first tune first-principles models based on the asset's historical data, before they are suitable for use. Given a set of ambient conditions for the asset of interest, a multi-objective optimizer probes the nonlinear predictive models of the asset to identify the Pareto-optimal set of input-output vector tuples that satisfy the asset's operational constraints. The multi-objective optimizer may utilize a set of historically similar operating points as seed points to initiate a flexible restricted search of the given search space around these points. A domain-based decision function is superimposed on the Pareto-optimal set of input-output vector tuples to filter and identify an optimal input-output vector tuple for the set of ambient conditions. The asset may be commanded to achieve this optimal state. This optimization process may be repeated as a function of time or as a function of changing operating and ambient conditions in the asset's state.

An online monitoring module observes the prediction performance of the nonlinear models as a function of time, and initiates dynamic tuning and update of the various nonlinear predictive models to achieve high fidelity in modeling and closed-loop optimal operational decision-making.

While the invention is described with respect to assets found in a coal-fired plant, it will be understood that the process management system is equally adaptable for use in a variety of other industries and for a wide variety of assets (e.g., gas turbines, oil-fired boilers, refinery boilers, aircraft engines, marine engines, gasoline engines, diesel engines, hybrid engines, etc.). The invention is also adaptable for use in the optimal management of fleets of such assets. The coal-fired boiler embodiment described herein is provided for illustration and is not to be construed as limiting in scope.

Turning now to FIG. 1, a model-based multi-objective optimization and decision-making system upon which the process management system may be implemented in exemplary embodiments will now be described. FIG. 1 includes a process manager 120 that is in communication with a user system 101, a storage device 102, a control system 103, and a network 105.

The process manager 120 includes a user interface and monitor 107, predictive models 104, a multi-objective optimizer and decision-maker 106, and objective/fitness functions 108. The process manager 120 may be implemented via computer instructions (e.g., one or more software applications) executing on a server, or alternatively, on a computer device, such as user system 101. If executing on a server, the user system 101 may access the features of the process manager 120 over network 105. The user system 101 may be implemented using a general-purpose computer executing one or more computer programs for carrying out the processes described herein. The user system 101 may be a personal computer (e.g., a laptop, a personal digital assistant) or a host attached terminal. If the user system 101 is a personal computer, the processing described herein may be shared by the user system 101 and the host system server (e.g., by providing an applet to the user system 101). User system 101 may be operated by project team members or managers of the provider entity. Various methods of implementing the prediction and optimization functions may be employed as described further herein.

The network 105 may be any type of known network including, but not limited to, a wide area network (WAN), a local area network (LAN), a global network (e.g. Internet), a virtual private network (VPN), and an intranet. The network 105 may be implemented using a wireless network or any kind of physical network implementation known in the art.

The storage device 102 may be implemented using memory contained in the user system 101 or host system or it may be a separate physical device. The storage device 102 is logically addressable as a consolidated data source across a distributed environment that includes a network 105. Information stored in the storage device 102 may be retrieved and manipulated via the host system and may be viewed via the user system 101.

Turning now to FIG. 2, a diagram of a Pareto Frontier graph of output objectives depicting results of an optimized process for various input variables will now be described. A sample Pareto-optimal front that jointly minimizes NOx and Heat Rate for a 400 MW target load demand in a 400 MW base-load coal-fired plant is shown. The clusters of circles graphical markers shown represent the range of historical operating points from a NOx—Heat Rate perspective. The star graphical markers and the inter-connecting concave curve show the optimized Pareto Frontier in the NOx—Heat Rate space. Each point not on this frontier is a sub-optimal operating point. The "Best Known Operating Zone" is the zone that is most favorable from a NOx—Heat Rate perspective achieved historically. Identification of the "Optimized Operating Zone" or the Pareto Frontier allows additional flexibility to trade-off NOx credits and fuel costs.

Turning now to FIG. 3, a flow diagram describing a process for implementing multi-objective predictive modeling upon which the process management system may be implemented in accordance with exemplary embodiments will now be described. Historical data relating to the asset being modeled is collected and filtered to remove any bad or missing data at step 302. As described above, historical data may include measurable elements resulting from operation of the asset (e.g., emission levels), operating conditions of the asset (e.g., fuel consumption), and ambient conditions (e.g., air temperature). The remaining historical operational data is categorized by three classifications at step 304. Data relating to controllable variables (also referred to as 'X') represent the first classification. These are parameters that can be changed or are changing. An example of a controllable parameter is fuel flow. Data relating to uncontrollable variables (also referred to as 'Z') represent a second classification. For example, an ambient temperature measurement may be classified as an uncontrollable variable, as this may not be within the direct control of a process management system. Another example of an uncontrollable variable is fuel quality parameter, as again this may not be within the direct control of a process management system.

Data relating to outputs, or objectives (also referred to as 'Y') represent a third classification. 'Y' objectives refer to the target goals of a process such as heat rate, nitrous oxide emissions, etc. 'Y' constraints refer to a required constraint on the output, and may be a constraint such as required power output. This classified data is stored in memory (e.g., storage device 102) and is maintained for current and future use. The process management system enables filtering of data, an example of which is depicted in FIG. 5. As shown in interface 500 of FIG. 5, 'X', 'Y', and 'Z' variables are classified in columns 502, 504, and 506, respectively, and are presented over a various time periods as indicated by rows 508. The filtering function may include signal-processing algorithms that are used to minimize the influence of faulty data in training the predictive models.

Steps 302 and 304 may be implemented initially upon set up of the process management system and then updated periodically as needed. A predictive model may now be created using this information as described below.

Figure 4A:
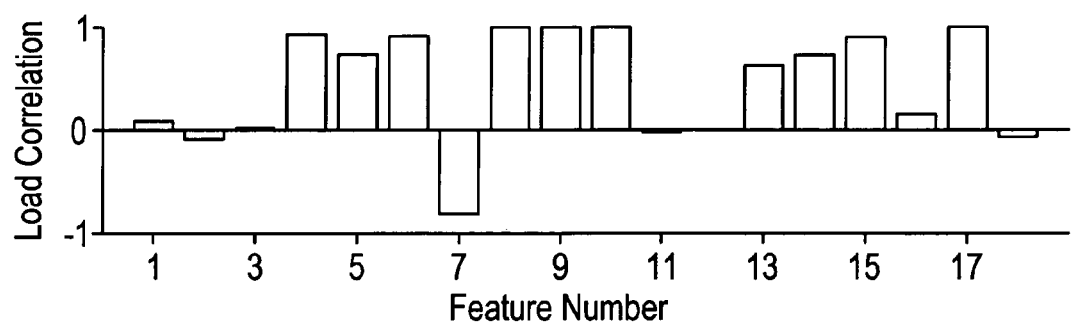
FIG. 4 is a diagram of correlations between process inputs and outputs.
Figure 4B:
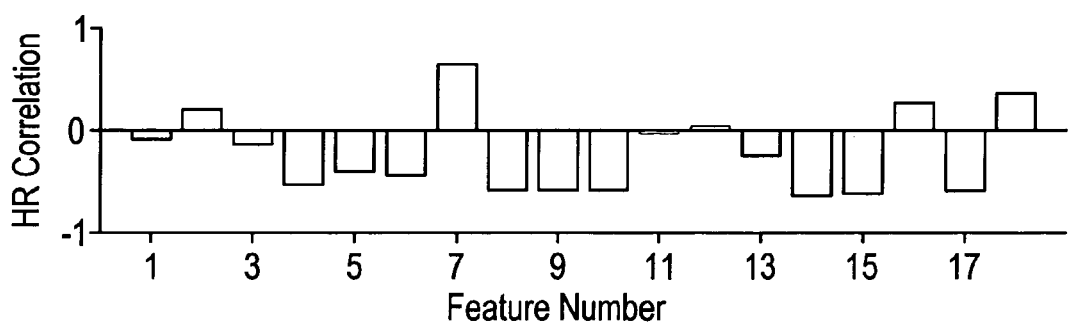
Figure 4C:
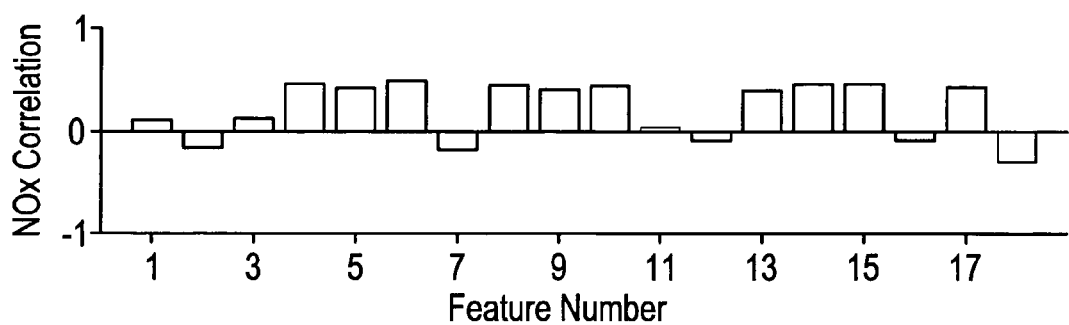
Figure 6:
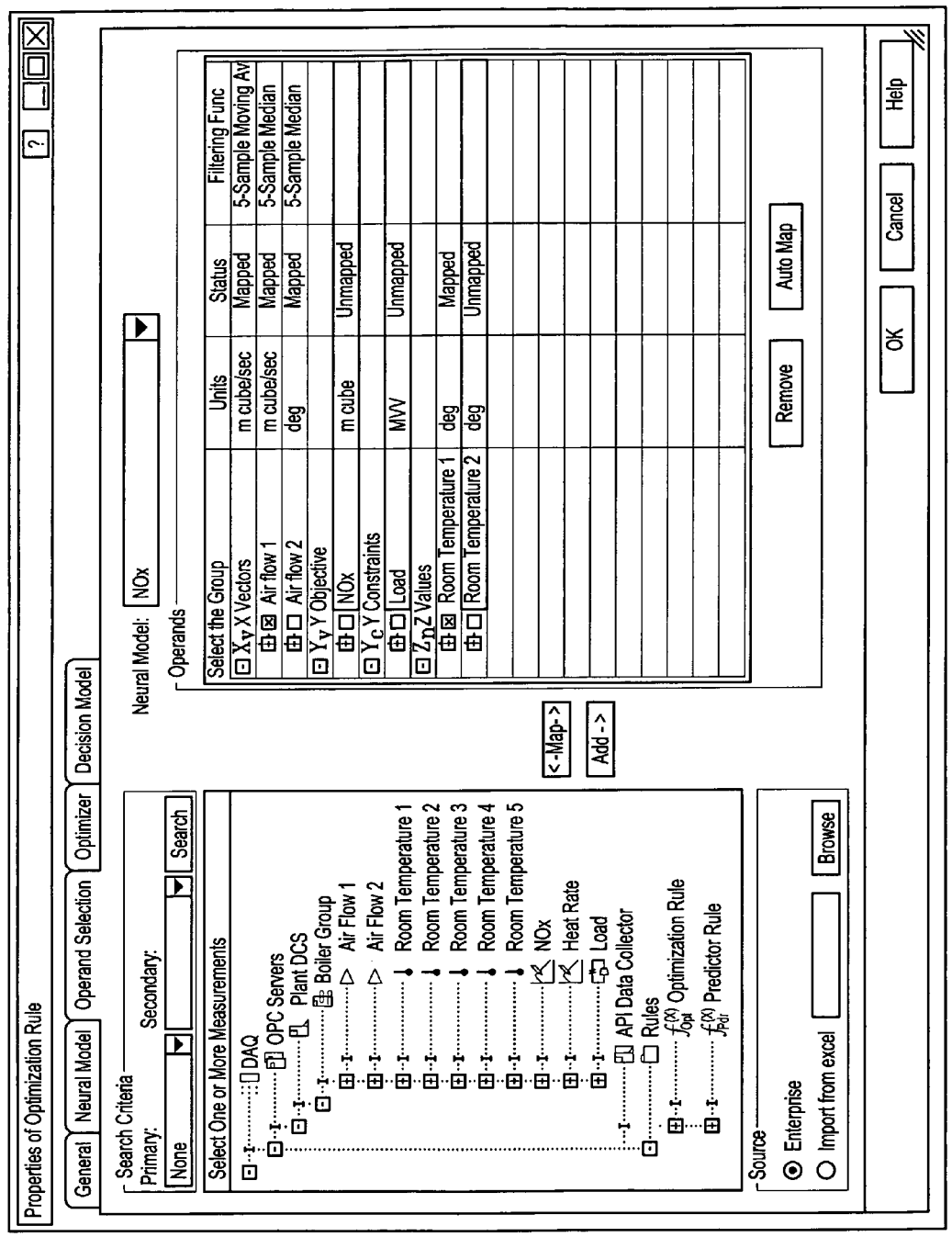
FIG. 6 is an interface supporting a sample candidate list and operand selections for use in generating a predictive model in exemplary embodiments.

At step 306, objectives and constraints of interest for the asset are identified. Multiple, sometimes conflicting objectives and constraints may be determined as desired. At step 308, controllable and uncontrollable variables (X, Z) are selected based upon their suitability for achieving a desired objective or required objective (Y). Analyzing the correlations between the (X, Z) variables and the Y objectives or constraints is an important step in determining the suitability of an (X, Z) variable in achieving a Y objective or constraint. An example of this correlation analysis is depicted in FIG. 4. The process management system provides an interface for selecting these inputs, a sample of which is shown in FIG. 6. A predictive model for each of the selected objectives is constructed at step 310.

Figure 7:
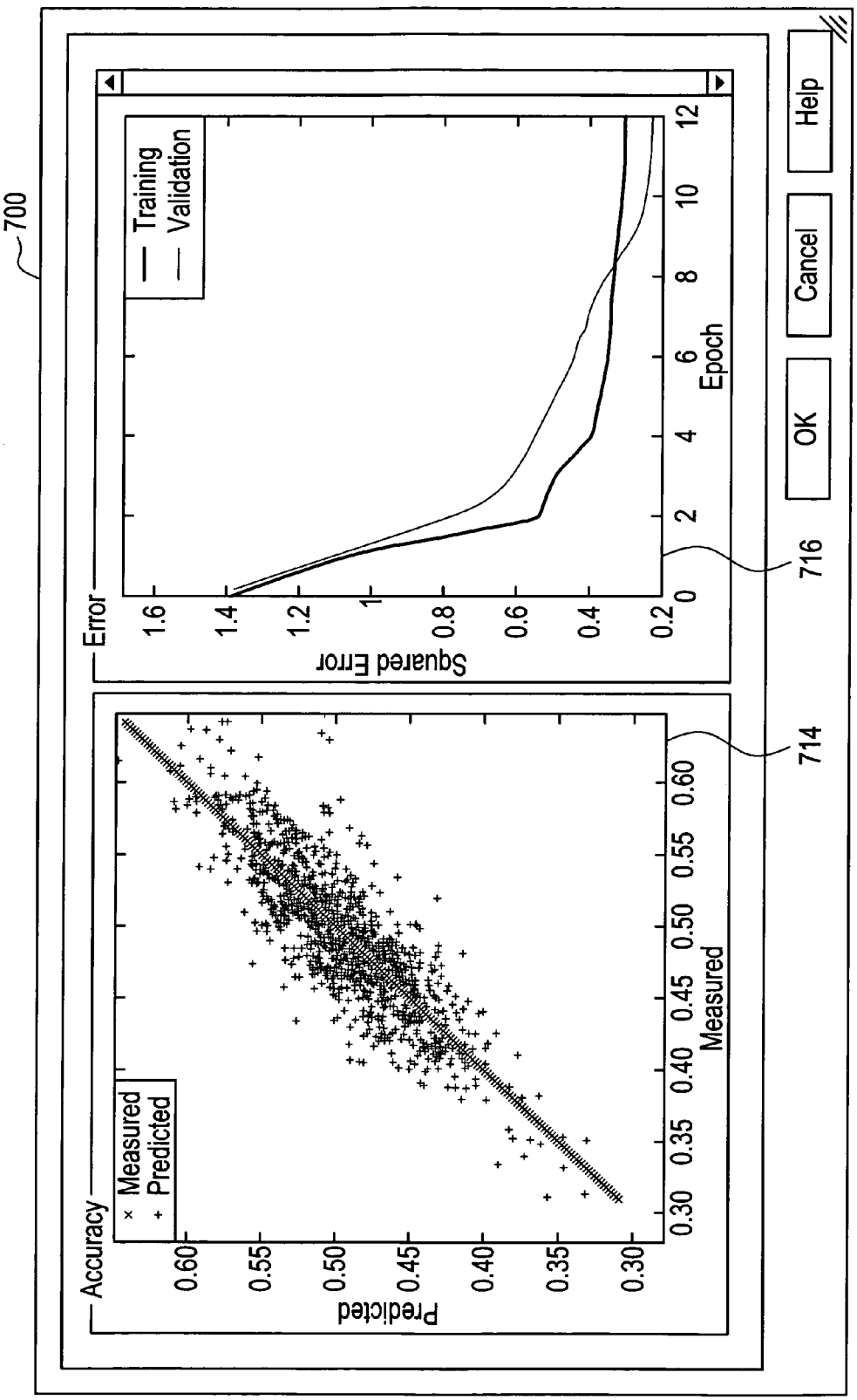
FIG. 7 is a validation graph for training a predictive model in exemplary embodiments.

The predictive model may be trained and validated for accuracy at step 312. The predictive model training and validation may proceed by inspection of an actual versus predicted graph 714 of FIG. 7 (relating to the accuracy or performance), and an error versus epoch (training cycle) graph 716 for each epoch of each predictive model training.

If the predictive model is valid, meaning that the predicted values coincide with the actual values, at step 314, then live data streams may be applied to the predictive models at step 316. If the predictive model is not valid at step 314, then the process returns to step 308 whereby alternative inputs (X, Z) are selected. These predictive models may then be used for optimization via the process management system.

Figure 8:
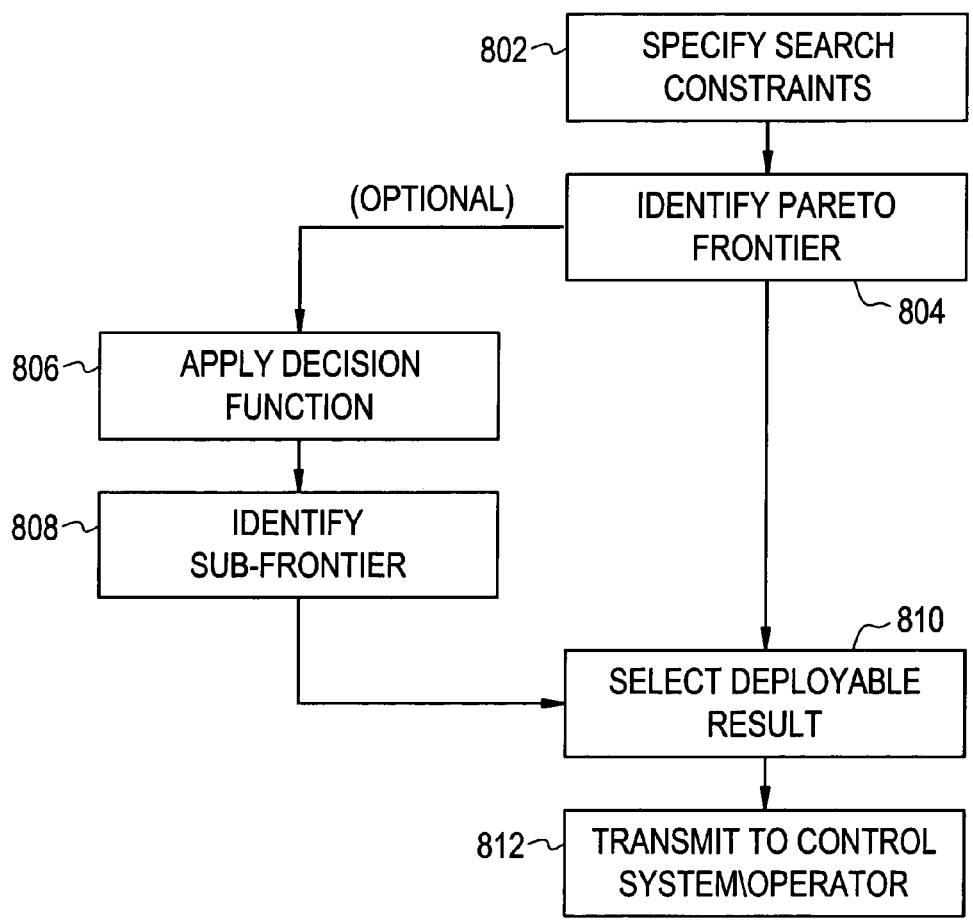
FIG. 8 is a flow diagram describing a process for performing multi-objective optimization and decision-making using predictive models in exemplary embodiments.

Turning now to FIG. 8, a process for multi-objective optimization using multiple predictive models is shown and described in FIG. 8., At step 802, the user specifies search constraints. A user may specify upper and lower bounds for each X set point. The upper and lower bounds represent the maximum and minimum allowable values for the input, respectively. In addition, the user may specify search tolerances for each input. The search tolerance represents the range of values around historically similar operating points that will be used as seed points to initiate a flexible restricted search of the given search space around these points, in the quest for the optimal value of 'Y'. Further, the user may specify optimization values (minimum/maximum) for each objective 'Y'.

Once these elements have been configured by the user, the process manager 120 identifies a corresponding Pareto Frontier at step 804 by applying a multi-objective optimization algorithm 106 to the predictive models 104. The objective/fitness functions 108 provide feedback to the multi-objective optimizer 106 in the identification of the Pareto Frontier. The Pareto Frontier provides optimal sets of input-output vector tuples that satisfy the operational constraints.

Optionally, a decision function may be applied to the Pareto Frontier at step 806. The decision function may be applied to the optimal sets of input-output vector tuples to reduce the number of input-output vector tuples in what may be referred to as a sub-frontier at step 808. One such decision function may be based on the application of costs or weights to objectives, whereby a subset of Pareto optimal solutions closest to an objectives weighting may be identified. Additional decision functions such as one that is capable of selecting one of the optimal input-output tuples that minimally perturbs the asset from its current state, may be applied. During this process, the process manager 120 provides a feature that enables a user to generate Pareto Frontier graphs that plot these data values. A sample Pareto Frontier graph is shown in FIG. 2.

A user at step 101 or process manager in accordance with the user at step 120 may select a deployable input-output vector using the results of the decision functions at step 810. The selected deployable optimal input-output vector is then transmitted to the control system 103 or an operator of the asset at step 812.

Over time, the predictive models are monitored to ensure that they are accurate. In many asset modeling and optimization applications, it is necessary to tune/update the predictive models in order to effectively accommodate moderate changes (e.g., as a function of time) in asset behavior while minimizing the time required for training the predictive models. The process management system enables on-line tuning for predictive models as described in FIG. 9.

Figure 9:
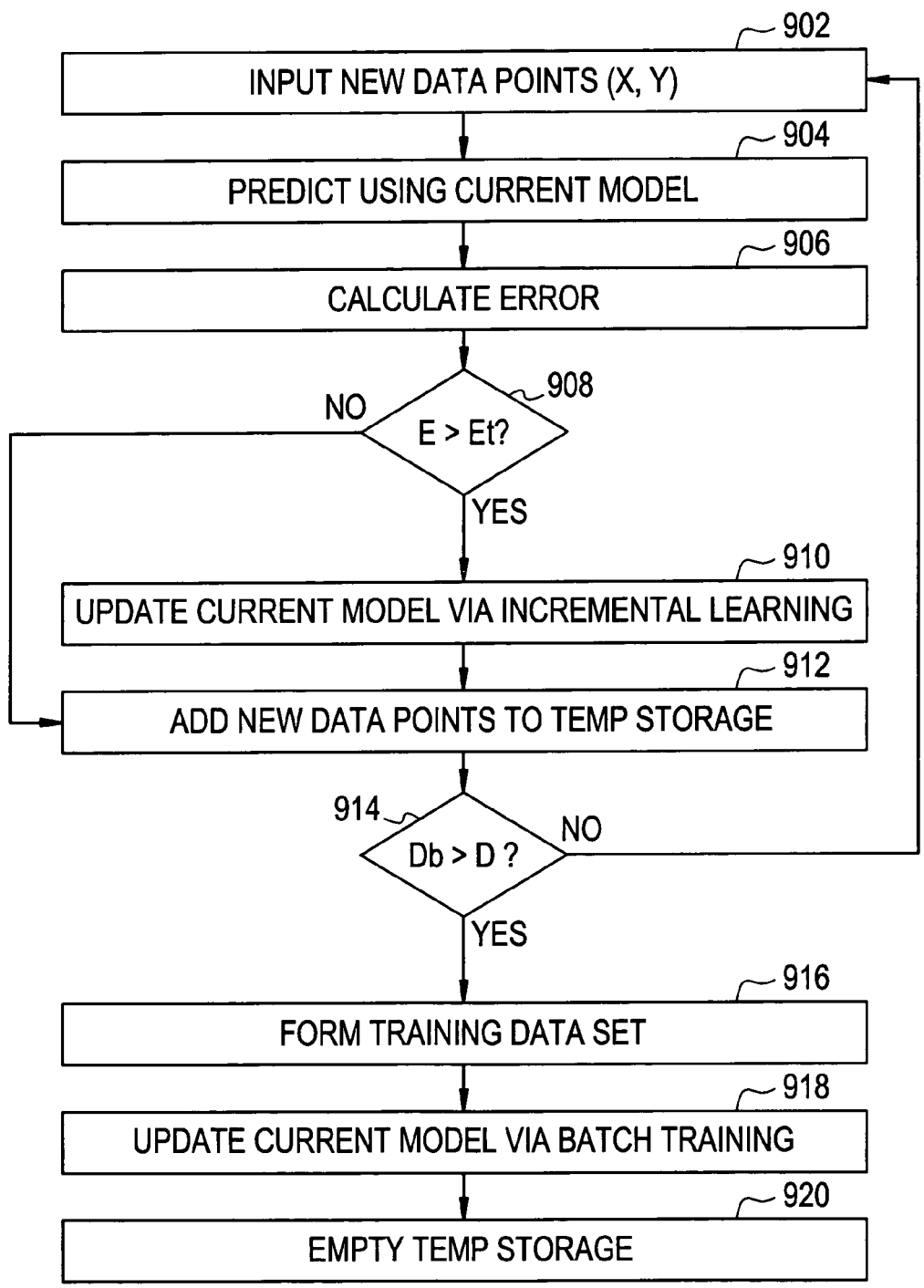
FIG. 9 is a flow diagram describing a process for implementing the monitoring and update functions of predictive models via the process management system in exemplary embodiments.

Turning now to FIG. 9, a flow diagram describing a process for monitoring and updating predictive models will now be described. New data points (X, Y) representing newly available process input-output information are input to the process manager 120 at step 902. The process monitor 107 validates each predictive model to determine its accuracy at step 904. An error calculation is performed at step 906. For example, the error calculation may be expressed as $E=\Sigma(y-\hat{y})$. If the error ratio, 'E', exceeds a pre-determined number, or threshold, '$E_t$', at step 908, the current model is updated via an incremental learning technique at step 910. The model parameters (e.g., weights) of the previously trained predictive model are updated incrementally via a learning algorithm based on the training dataset so the resultant predictive model adapts to approximate a function of interest.

Upon updating each current model, or alternatively, if the error ratio, 'E', does not exceed the pre-determined threshold, '$E_t$', the new data points are added to temporary storage at step 912. The temporary storage, or buffer, has a fixed size, 'D'.

If adding the new data points to the temporary storage overflows the buffer ($D_b$>D) at step 914, then a new training set is created at step 916. Otherwise, the process returns to step 902. At step 918, the current model is updated via a batch training technique and the temporary storage is emptied at step 920. The batch training trains the predictive model using the data set formed in step 916. Unlike incremental learning, the batch training is more thorough, and may include training, cross-validation, and model configuration optimization. Batch training may be performed at a fixed time interval or when the maximum data size of the buffer that stores the new data is reached. While incremental training of a predictive model allows it to adapt continually to changing asset conditions, batch training of a predictive model helps to periodically recalibrate the models using a more rigorous approach.

As described above, the embodiments of the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention.

An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. The technical effect of the executable code is to facilitate prediction and optimization of model-based assets.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computerized method for performing multi-objective asset optimization and decision-making using predictive modeling, comprising:

building, via a process manager application executing on a processor, at least two predictive models for an asset, the asset comprising a physical machine that is communicatively coupled to the processor, the building comprising:

categorizing operational historical data of the asset that is retrieved from a storage device, the operation historical data categorized by at least one of:

controllable variables;

uncontrollable variables;

output objectives; and constraints;

selecting at least two output objectives or constraints; and identifying at least one controllable or uncontrollable variable suitable for achieving the at least two output objectives or constraints;

inputting, via the process manager application, the at least one controllable or uncontrollable variable to each of the at least two predictive models;

validating, via the process manager application, each predictive model;

if results of the validating indicate a confidence level above a specified threshold, applying, via the process manager application, a live data stream of inputs from the asset to the predictive models;

if results of the validating indicate a confidence level at or below a specified threshold, selecting, via the process manager application, at least one alternative controllable or uncontrollable variable for input to the predictive models;

performing, via the process manager application, multi-objective optimization using the predictive models, comprising:

specifying search constraints, comprising:

upper and lower bounds for each input variable; and tolerance levels representing a range of values for achieving optimal output objectives, and constraints;

applying a multi-objective optimization algorithm; and generating a Pareto Frontier, the Pareto Frontier including optimal input-output vectors;

using results of the multi-objective optimization, selecting, via the process manager application, from the Pareto Frontier, a Pareto optimal input-output vector for deployment to the asset, the selected Pareto optimal input-output vector specifying an optimal operational state for the asset; and re-configuring the asset, via the process manager application, using the Pareto optimal input-output vector to realize the optimal operational state.

2. The computerized method of claim 1, wherein the controllable variable includes input parameters that are changeable and the uncontrollable variable includes input parameters that are static.

3. The computerized method of claim 1, wherein the physical machine includes at least one of:

a gas turbine;
an oil-fired boiler;
a refinery boiler;
an aircraft engine;
a marine engine;
a gasoline engine;
a diesel engine; and
a hybrid engine.

4. The computerized method of claim 1, wherein the output objective includes a target goal for a process.

5. The computerized method of claim 1, wherein the constraint includes a restriction placed on an output.

6. The computerized method of claim 1, wherein the validating is accomplished by comparing predicted results of the inputting to actual results of inputting.

7. The computerized method of claim 1, wherein the multi-objective optimization algorithm is at least one of:

an evolutionary algorithm;
a gradient-based algorithm;
a hybrid algorithm; and Pareto Frontier generator.

8. The computerized method of claim 1, further comprising selecting, via the process manager application, one of the Pareto optimal input-output vectors for deployment that minimally perturbs the asset from its existing controllable variables configuration.

9. The computerized method of claim 1, further comprising:

applying, via the process manager application, a decision function to results of the generating a Pareto Frontier, wherein selecting an input-output vector for deployment is based upon results of the applying a decision function capable of reducing the number of input-output vectors.

10. A system for performing multi-objective asset optimization and decision-making using predictive modeling, comprising:

a processor;

an asset in communication with the processor, the asset comprising a physical machine; and a process manager application implemented by the processor, the process manager application performing:

building at least two predictive models for the asset, comprising:

categorizing operational historical data of the asset that is retrieved from a storage device, the operation historical data categorized by at least one of:

controllable variables;
uncontrollable variables;
output objectives; and
constraints;

selecting at least two output objectives or constraints; and identifying at least one controllable or uncontrollable variable suitable for achieving the at least two output objectives or constraints;

inputting the at least one controllable or uncontrollable variable to each of the at least two predictive models;

validating each predictive model;

if results of the validating indicate a confidence level above a specified threshold, applying a live data stream of inputs from the asset to the predictive models;

if results of the validating indicate a confidence level at or below a specified threshold, selecting at least one alternative controllable or uncontrollable variable for input to the predictive models;

performing multi-objective optimization using the predictive models, comprising:

specifying search constraints, comprising:

upper and lower bounds for each input variable; and tolerance levels representing a range of values for achieving optimal output objectives, and constraints;

applying a multi-objective optimization algorithm; and generating a Pareto Frontier, the Pareto Frontier including optimal input-output vectors;

using results of the multi-objective asset optimization, selecting, from the Pareto Frontier, a Pareto optimal input-output vector for deployment to the asset, the Pareto optimal input-output vector specifying an optimal operational state for the asset; and re-configuring the asset using the Pareto optimal input-output vector to realize the optimal operational state.

11. The system of claim 10, wherein the controllable variable includes input parameters that are changeable and the uncontrollable variable includes input parameters that are static.

12. The system of claim 10, wherein the physical machine includes at least one of:

a gas turbine;
an oil-fired boiler;
a refinery boiler;
an aircraft engine;
a marine engine;
a gasoline engine;
a diesel engine; and
a hybrid engine.

13. The system of claim 10, wherein the output objective includes a target goal for a process.

14. The system of claim 10, wherein the constraint includes a restriction placed on an output.

15. The system of claim 10, wherein the validating is accomplished by comparing predicted results of the inputting to actual results of inputting.

16. The system of claim 10, wherein the multi-objective optimization algorithm is at least one of:
   an evolutionary algorithm;
   a gradient-based algorithm;
   a hybrid algorithm; and
   Pareto Frontier generator.

17. The system of claim 10, wherein the process manager application further performs selecting one of the Pareto optimal input-output vectors for deployment that minimally perturbs the asset from its existing controllable variables configuration.

18. The system of claim 10, wherein the process manager application further performs:
   applying a decision function to results of the generating a Pareto Frontier, wherein selecting an input-output vector for deployment is based upon results of the applying a decision function capable of reducing the number of input-output vectors.

* * * * *